United States Patent Office 3,376,996
Patented Apr. 9, 1968

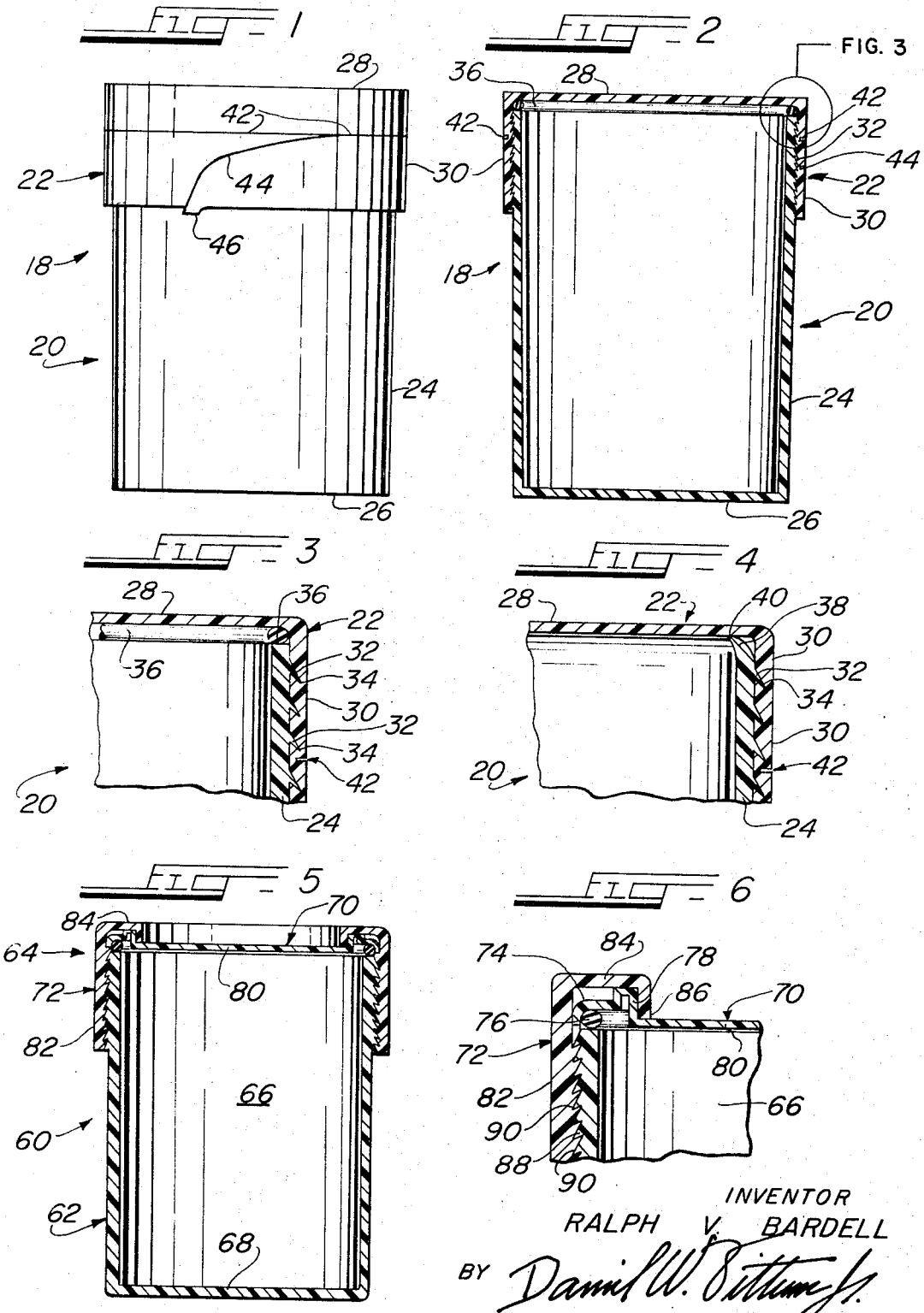

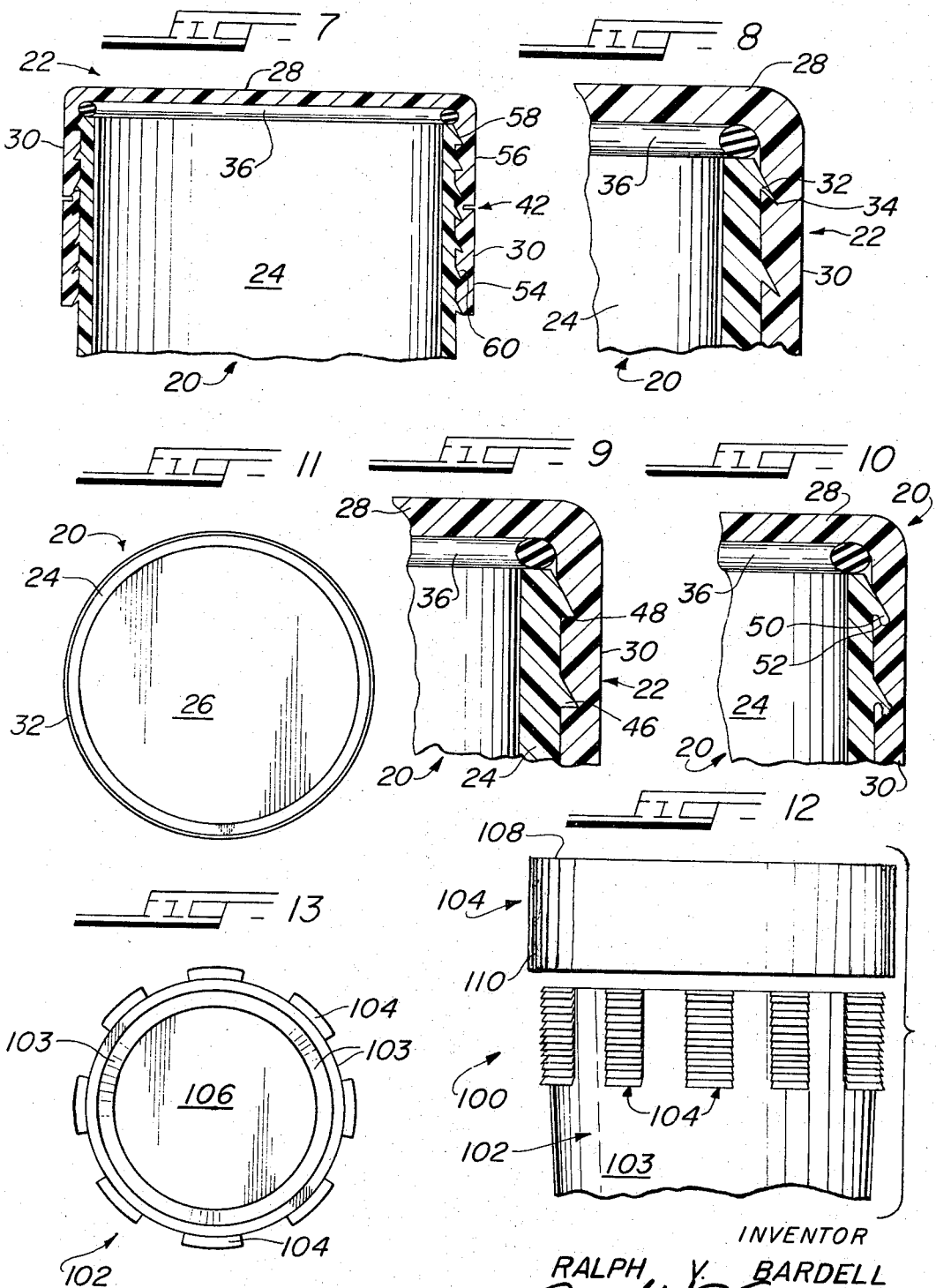

3,376,996
SEALING ARRANGEMENT FOR
PLASTIC CONTAINER
Ralph V. Bardell, Homewood, Ill., assignor to Bennett Industries, Inc., Peotone, Ill., a corporation of Delaware
Filed Sept. 21, 1966, Ser. No. 581,081
17 Claims. (Cl. 220—24)

This invention generally relates to plastic container sealing arrangements and more particularly concerns a sealing arrangement for cylindrical plastic drums, pails, and the like.

The advantages of fabricating a shipping container from plastic rather than conventional materials such as steel are obvious. A plastic container suitable for shipping and storage would be more economical than a similarly sized metal container by reason of the comparatively higher cost of conventionally utilized metals (such as steel) in relation to plastics (such as polyethylene). Moreover, problems of corrosion, which often arise with metal containers, could be avoided since plastics are generally more resistant than metals to corrosion and other similar forms of attack. Additionally, the effective substitution of plastic for metal in a commercial shipping container results in significant economies with respect to the weight of the container. However, despite these advantages, it has been difficult to conveniently use plastics for commercially acceptable shipping storage containers because of the difficulties involved in providing acceptable sealing arrangements for use with a plastic container body.

A container adapted to be used in packaging, storing, and shipping liquids, semi-liquids, and dry materials requires a closure member that is firmly attached to the container body by a sealing arrangement in order to withstand the abuses of freight handling and shipping. In addition, such a sealing arrangement should preferably be reuseable, that is, it should be possible to close, open, and reclose the container without having to employ a new closure means to reclose the container.

The use of synthetic material such as plastic for the fabrication of shipping containers has long been hampered by the difficulty involved in providing acceptable sealing arrangements therefor. Conventional methods or devices employed in connection with prior art metal containers are not suited for use with plastic container bodies. Instead, it has been necessary to redesign container sealing arrangements and methods in order to provide container sealing arrangements that may be satisfactorily employed with plastic container bodies. In addition to the difficulty experienced in providing mechanically compatible sealing arrangements for plastic containers, problems of strength and stability have impeded the widespread use of plastic shipping containers. Thus, the union between a closure member and a container body must be capable of withstanding the stress and strain of normal use for shipping purposes. In particular, an effective fluid-tight seal adapted to withstand both internal and external pressures must be provided.

Many prior art metal containers utilize a lug design whereby the closure is attached to the container by bending lugs around a lip on the side wall of the container body. This method of closing containers has not in practice been entirely satisfactory because, once the container has been opened, a proper seal can only be achieved upon reclosing the container by rebending each lug around the lip. Laborers using this type of container on the job often for convenience only rebend a few of the lugs thereby resulting in the formation of a poor seal. Therefore, it is desirable to provide a sealing arrangement which may easily be opened and yet which may be effectively closed and reopened on the job with a minimum of effort and equipment and without the sealing arrangement losing its ability to reseal the container each time.

In accordance with the present invention, it has been found that a highly useful all plastic container can be obtained by employing a container-closure of the following design. Briefly, the container-closure combination of the present invention comprises an open end container body having a generally cylindrical side wall structure and an integrally formed bottom wall structure at one end of the body, the other end of the body being opened; barb means on the outer surface of the side wall structure of the container body adjacent the open end thereof; closure means adapted for placement downwardly over the open end of the container body and having a depending side wall structure, the inside diameter of the side wall structure being substantially the same as the outside diameter of the side wall structure of the container body; groove means formed in the inner surface of the depending wall structure of the closure member, the said groove means being adapted to removably mate with the barb means on the container body when the closure member is positioned over the open end of the container body; and resilient sealing means adapted for positioning between the container body and the closure member and adapted to urge the closure member away from the container body whereby the barb means are maintained in positive locking engagement with the corresponding groove means and whereby a fluid-tight seal is effected between the closure member and the container body.

Thus, a primary object of the present invention is to provide a sealing arrangement for an all plastic shipping container comprising a container body and a closure member which may easily be opened and closed on the job site without special tools, and which will produce an effective seal each time it is closed.

Another object of the present invention is to provide a sealing arrangement of the character described which may be easily and effectively closed after initial filling by conventional closing equipment.

Another object of the present invention is to provide a sealing arrangement of the character described in accordance with which a strong, tight, fluid-tight seal is effected between the closure member and the sealing surface on the container body.

Yet another object of the present invention is to provide a sealing arrangement of the character described in accordance with which a simplified method of construction of different sizes and styles of containers may be achieved at low cost.

These and other objects, advantages, and features of the subject invention will hereinafter appear, and, for purposes of illustration, but not of limitation, exemplary embodiments of the present invention are illustrated in the accompanying drawings, in which:

FIGURE 1 is an elevational view of a container body with a closure member attached thereto;

FIGURE 2 is a sectional view thereof taken substantially along line 2—2 in FIGURE 1;

FIGURE 3 is an enlarged fragmentary sectional view of the portion of the container body and the closure member encircled in FIGURE 2;

FIGURE 4 is an enlarged fragmentary sectional view similar to FIGURE 3 illustrating a modified sealing means;

FIGURE 5 is a vertical sectional view taken through the center of a container having a two-piece closure member attached thereto;

FIGURE 6 is an enlarged fragmentary sectional view of the portion of the container body and the closure member illustrated in FIGURE 5;

FIGURE 7 is a fragmentary sectional view of another container and closure member produced in accordance with the present invention;

FIGURES 8-10 are enlarged fragmentary sectional views of a container body and closure member therefor illustrating various interlocking means;

FIGURE 11 is a plan view of the container body shown in FIGURE 1;

FIGURE 12 is an exploded fragmentary elevational view of yet another container body and closure member produced in accordance with the present invention; and FIGURE 13 is a plan view of the container body shown in FIGURE 12.

With reference to the drawings, a composite container 18, comprising a container body 20 and a closure member 22, is shown. Container body 20 comprises a generally cylindrical side wall structure 24 and an integrally formed bottom wall structure 26. Closure member 22 comprises a generally planar top wall structure 28 and an integrally formed depending side wall structure 30. The inside diameter of wall structure 30 is substantially the same as the outside diameter of the container body 20.

Container body 20 and closure member 22 are preferably formed from a suitable semi-rigid plastic having strength sufficient to withstand the abuses to which a shipping container is subjected in normal use. Linear, high density polyethylene is an especially suitable plastic material, although other plastics of the polyolefin or petrochemical family may be employed. An especially preferred plastic is polyethylene havng a density ranging between 0.941 and 0.965 gram per cubic centimeter (ASTM Test D-1505-60 T) and a melt index ranging between 0.1 and 9.0 (ASTM Test D-1238-57 T). Where the latter preferred polyethylene is employed in producing a blow molded container, the melt index preferably ranges between 0.1 and 0.5, whereas when it is employed in producing an injection molded container, the melt index preferably lies between 4.0 and 9.0. Of course, as will be obvious to those skilled in the art, container body 20 and closure member 22 may be constructed or fabricated from various other materials. In particular, the container could be advantageously fabricated of stamped or rolled steel or aluminum metal.

A plurality of cooperating interlocking means are provided on the inside of side wall structure 30 and on the outside of the upper portion of side wall structure 24. As best shown in FIGURE 3, the interlocking means on side wall structure 24 take the form of a plurality of continuous annular barbs 32. Thirteen such barbs 32 are employed on container 20, although more or less may be employed depending upon the specific use for which the container is intended. A like plurality of complementary continuous annular grooves 34 of corresponding cross section are provided in the depending wall structure 30 of closure member 22.

Sealing means in the form of a resilient annular sealing gasket 36 is adapted to be positioned on top of the side wall structure 24 for a purpose that will hereinafter appear.

FIGURES 1-3 show the closure member 22 in fastened engagement with container body 20 whereby annular barbs 32 are positioned within corresponding grooves 34. The engagement of barbs 32 and grooves 34 normally serves to preclude removal of closure member 22 from container body 20. Sealing gasket 36 is compressed between the top wall structure 28 of closure member 22 and the upper edge of side wall structure 24 of container body 20 and thus urges closure member 22 upwardly away from container body 20, thereby serving to hold barbs 32 and corresponding grooves 34 in locked engagement. So long as this relationship is maintained, closure member 22 is held tightly into the container body 20, and a fluid-tight seal is maintained by the gasket 36.

A modified version of the sealing means is shown in FIGURE 4. Instead of the annular sealing gasket 36 illustrated in FIGURES 2 and 3, an annular plastic flange 38 is formed at the top of side wall structure 24. A lip portion 40 of flange 38 extends inwardly slightly toward the center of the container. The plastic from which container body 20 is molded is sufficiently resilient that, when the closure member 22 is forced downwardly over the container body, end portion 40 of flange 38 engages the underside of planar top wall structure 28 and urges the closure member 22 upwardly, whereby a tight, interlocking engagement is achieved between the annular barbs 32 and the corresponding annular grooves 34. The sealing means illustrated in FIGURE 4 has the advantage, relative to the FIGURE 3 arrangement, of eliminating the need for separately positioning a sealing gasket over the top portion of the container side wall structure 24.

An annular tear-away groove 42 is preferably molded in the outer surface of depending wall structure 30 of closure member 22. A similar tear away groove 44 extends from groove 42 downwardly to the lower edge of side wall structure 30. A pull tab 46 (see FIGURE 1) is formed downwardly from side wall structure 30 adjacent the groove 44. As best shown in FIGURE 3, groove 42 extends only partly through the thickness of side wall structure 30. Similarly, groove 44 extends part-way through the thickness of side wall structure 30.

Tab 46 and grooves 42, 44 cooperate to provide means for effecting an easy initial opening of the container 18. After the container has been filled and initially closed, in order to open it, it is merely necessary to grasp tab 46 and pull it away from container body 20. The lower portion of side wall structure 30 of closure member 22 separates first along groove 44 and thereafter along groove 42 thereby effecting a removal of the lower portion of side wall structure 30. In this manner, some, but not all, of the barbs are disengaged from the corresponding grooves in the lower portion of side wall structure 30. The closure member 22 remains attached to container body 20 by the topmost few grooves. The closure member 22 may then be removed by inserting a pointed instrument such as a screwdriver between the container body and the remainder of side wall structure 30 and prying member 22 loose. Thereafter, closure member 22 may be reattached by forcing it downwardly over the open end of container body 20 so that the uppermost few grooves on the remaining upper portion of side wall structure 30 re-engage the corresponding barbs on the container body. The same procedure may be followed to reopen and reclose the container any number of times while it is in use.

In the particular embodiment illustrated in FIGURES 1-3, the lower portion of the side wall structure has ten grooves 34 and the top portion has three grooves. Thus, during shipment all thirteen grooves are interlocked with corresponding barbs, and, after the initial opening of the container, three grooves interlock with barbs. The precise numbers of grooves and the upper and removable lower portion of side wall structure may, of course, be varied in accordance with the particular use for which the container is intended.

The use of a tear-away portion of the closure member is particularly advantageous since a stronger and more effective seal is thereby maintained during shipment. Thereafter, when the container reaches the point of ultimate use, the lower portion of the closure may be removed in order to obtain an arrangement which may be easily reopened and reclosed and yet which, when closed, provides an effective tight seal between the closure member and the container body.

While the grooves 42, 44 illustrated in the drawings are provided in the outer surface of the container closure, they could easily be provided in the inner surface. Also, while the grooves in the drawings are continuous, they could be discontinuous if desired, or perforations could be employed in place of grooves.

As best illustrated in FIGURES 8–10, the precise configuration of the barb means on the container body and the corresponding groove in the closure member may be varied in accordance with the precise type of interlock desired. FIGURE 8 shows a barb-groove combination designed to produce an extremely tight-fitting seal. The lower surfaces of barbs 32 and grooves 34 are inclined downwardly in an outward direction (i.e., the surfaces are inclined downwardly from the point nearest the center of the container to the point most distant therefrom). When the closure member 22 is urged upwardly by the sealing gasket 36, the closure is held in locked engagement. In order to remove the closure member shown in FIGURE 8, it is necessary to insert a screwdriver or the like between the closure member 22 and the container body 20 in order to effect a separation of the barbs and grooves. Opening is facilitated by urging the closure downwardly against the sealing gasket 36 and, at the same time, inserting an instrument in order to pry the closure member away from the container body.

FIGURE 9 shows a barb-groove combination adapted to produce a more easily opened container. A plurality of annular barbs 46 are formed on the container body of the container shown in FIGURE 9. The lower surface of each barb 46 is generally horizontal as are the lower surfaces of a like plurality of corresponding grooves 48. Since these lower surfaces are generally horizontal (i.e., rather than inclined as in the barb-groove combination shown in FIGURE 8), the closure member 22 may be more easily separated from the container body. nonetheless, an effective, fluid-tight seal is achieved.

FIGURE 10 shows a barb-groove combination particularly adapted for use with thin-walled containers. Each of the barbs 50 formed on the container body is generally downwardly extending and, in addition, has a bead formed at its end. Grooves 52 of corresponding cross section are formed in the closure member. Thus, when the container closure member is forced onto the container body, a snap-tight interlock between the corresponding barbs and grooves is obtained, thereby providing an especially tight interlock between the closure and the container body. This effect is achieved even though the barb extends only a relatively short distance away from the outer surface of the container body. Once again, opening of the arrangement is easily achieved by forcing the closure downwardly against the pressure exerted by sealing gasket 36 and simultaneously inserting a screwdriver or other sharp instrument in order to pry the closure member away from the container body.

An especially preferred embodiment of the present invention is illustrated in FIGURE 7. Depending side wall structure 30 of closure member 22 has a lower portion 54 which may be separated and removed in the foregoing manner from an upper portion 56 thereof. The type of barb-groove combination 60 provided adjacent portion 54 is that shown in FIGURE 8, i.e., the arrangement adapted to produce an especially strong interlock. In contrast, adjacent portion 56, the barb-groove combination 58 is of the type shown in FIGURE 9, i.e., the arrangement adapted for easy opening and closing.

Thus, during the period of maximum stress (i.e., shipping) the closure member is maintained in an especially tight, locked engagement with the container body by virtue of the barb-groove combination 60. When it is desired to open the container initially, the lower portion 54 is separated thereby leaving the closure member 22 attached to the container body by means of the barb-groove combination 58, which is especially designed for easy opening and closing. However, even though barb-groove combinations such as those shown in FIGURE 9 are relatively easily reopened, a tight, fluid-tight seal is nonetheless obtained when the container is reclosed.

A modified version of the closure-container combination of the present invention is shown in FIGURES 5 and 6 in which a composite container 60, comprising a container body 62 and a closure combination 64, is illustrated. Container body 62 comprises a generally cylindrical side wall structure 66 and an integrally formed bottom wall structure 68. Closure combination 64 comprises a generally planar lid member 70 and a sealing collar 72. Lid member 70, which may be metallic or plastic, has formed therein adjacent its outer edge a downwardly facing rim 74 adapted to fit downwardly over a sealing gasket 76. Instead of a sealing gasket, a flowed in or poured on sealing compound which, via baking, becomes an integral part of the lid may be employed where the lid member 70 is fabricated of metal. A retaining bead 78 is molded in the lid member 70 between the rim 74 and a generally flat central portion 80 of the lid member 70. The sides and top of bead 78 are respectively perpendicular to and parallel with flat central portion 80 for a purpose that will hereinafter appear.

Sealing collar 72 comprises a depending side wall structure 82 and a generally horizontal upper flange 84, with a downwardly extending lip 86 being molded integrally with flange 84. A plurality of annular circumferential barbs 88 are molded in the side wall structure 66 of container body 62, and a like plurality of corresponding grooves 90 are molded in the inside surface of depending wall structure 82 of collar 72. The downwardly facing lip 86 of collar 72 is adapted to fit over retaining bead 78 of the top member 70 as shown in the drawings.

In order to remove the closure assembly 64 from the container body 62, it is merely necessary to insert a screwdriver or other sharp instrument between the wall structures 82 and 66 in order to separate the barbs 88 from the grooves 90 thereby permitting the removal of collar 72. Thereafter, the lid member 70 is merely lifted away from the container. In order to reclose the container, the sealing gasket 76 is placed in position and the lid member 70 placed thereover. The collar member 72 is then forced downwardly over it so that the lip 86 is positioned with respect to the bead 78. The barbs 88 snap into place in the grooves 90 thereby completing the closing operation. Of course, a lower portion of tear-away portion of collar 72 may be adapted to be torn away as previously described in connection with the closure members illustrated in FIGURES 1–3 and 7. Likewise, the configuration of the barb-groove combination may be varied in the manner shown in FIGURE 7.

Still another embodiment of the present invention is illustrated in FIGURES 12 and 13. Although it is generally contemplated that the barbs on the container body be annular and continuous (see, for example, top groove 32 on container body 20 illustrated in the FIGURE 11 plan view), it is feasible to employ discontinuous barbs on the container body. In FIGURE 12 a composite container 100 comprising a container body 102 and a closure member 104 is illustrated. Container body 102 comprises a side wall structure 103 and a bottom wall structure 106 (see FIGURE 13). Closure member 104 comprises a top wall structure 108 and a depending side wall structure 110.

A plurality of barbed segments 104 are provided on the side wall structure 103 of container 102. Each barbed segment 104 may have a cross sectional configuration corresponding to one of those previously described (see FIGURES 8–10), but, as shown in FIGURES 12 and 13, they are discontinuous. A plurality of mating grooves (not shown) are provided on the interior of side wall structure 110 of closure 104. While the mating grooves on the interior of side wall structure 110 may be discontinuous also, it is most convenient to provide continuous annular grooves in the container closure even though discontinuous grooves are provided on the container body, so that it is unnecessary to index the closure with reference to the container body when reclosing it. The molding of a container with discontinuous barbs facilitates the molding of the container body (i.e., the use of discontinuous barbs avoids the molding problems encountered in molding continuous annular barbs). An added advantage is that substantial material savings may be achieved (i.e., less plastic material is required to fabricate a container with discontinuous barbs than is required to fabricate a container having continuous barbs).

Another variation of the present invention is also illustrated in FIGURES 12 and 13. As shown there, the side wall structure 103 of container body 102 below barbed segments 104 is generally tapered inwardly toward the bottom 106 thereof, so that the container body 20 may be stacked in a nested fashion when empty. In this manner material savings in storage space may be achieved for the containers when empty.

In accordance with the present invention, a novel and unique container-closure combination is provided, a combination which achieves the desired convenience and effectiveness in opening and closing yet which may be economically manufactured. It should be understood that, while the preferred embodiments illustrated herein show barb means on the container body with corresponding grooves in the closure member, the reverse arrangement could also be employed, that is, the barbs could be provided on the interior of the closure member and the corresponding grooves could be molded in the container body.

It should also be understood that various changes, modifications, and variations in the structure and function of the present invention may be effected without departing from the spirit and the scope thereof, as defined in the appended claims.

What is claimed is:
1. A container comprising in combination:
an open end container body having a generally cylindrical side wall structure and an integrally formed bottom wall structure at one end of the body, the other end of the body being open;
barb means on the outer surface of the side wall structure of the container body adjacent the open end thereof;
closure means adapted for placement downwardly over the open end of the container body and having a depending side wall structure, the inside diameter of the depending side wall structure being substantially the same as the outside diameter of the side wall structure of the container body;
groove means formed in the inner surface of the depending side wall structure of the closure member, the groove means being adapted to removably mate with the barb means on the container body when the closure member is positioned over the open end of the container body; and
resilient sealing means adapted for positioning between the container body and the closure member and adapted to urge the closure member away from the container body whereby the barb means are maintained in positive locking engagement with the corresponding groove means and whereby a fluid-tight seal is effected between the closure member and the container body.

2. A container, as claimed in claim 1, wherein the container body and the closure member are molded from plastic.

3. A container, as claimed in claim 2, wherein the barb means comprise a plurality of generally horizontal annular barbs integrally molded on the side wall structure of the container body adjacent the open end thereof and wherein the groove means comprise a like plurality of generally horizontal annular grooves, the cross sections of which are substantially similar to the cross sections of the corresponding barbs.

4. A container, as claimed in claim 3, wherein each annular barb is continuous.

5. A container, as claimed in claim 3, wherein each annular barb is discontinuous.

6. A container, as claimed in claim 3, wherein each barb is of generally triangular cross section and has a generally flat lower surface that is inclined downwardly in an outward direction.

7. A container, as claimed in claim 3, wherein each barb is of generally triangular cross section and has a generally horizontal lower surface.

8. A container, as claimed in claim 3, wherein each barb is downwardly pointed and has an annular bead formed at the outer end thereof.

9. A container, as claimed in claim 3, and further comprising opening means for separating a lower portion of the depending side wall structure of the closure member from the remaining portion thereof so as to disengage a substantial number of the grooves from the corresponding barbs on the side wall structure container body so as to facilitate the removal of the closure member from the container body.

10. A container, as claimed in claim 9, wherein the said opening means includes:
a first annular tear-away groove formed in the depending side wall structure of the closure member;
a second tear-away groove formed in the depending side wall structure and leading from the said first tear-away groove to the lower edge of the depending side wall structure; and
tab means formed on the lower edge of the depending side wall structure adjacent the said second tear-away groove.

11. A container, as claimed in claim 10, wherein the barbs and grooves above the said first tear-away groove are of generally triangular cross section and have generally horizontal lower surfaces and wherein the barbs and grooves below the said first tear-away groove are of generally triangular cross section and have generally flat lower surfaces that are inclined downwardly in an outward direction.

12. A container, as claimed in claim 3, wherein said sealing means comprises a resilient annular sealing gasket adapted for positioning adjacent the top edge of the side wall structure of the container body.

13. A container, as claimed in claim 3, wherein the sealing means comprises an upwardly and inwardly pointed flange member integrally formed with the side wall structure of the container body and adapted to engage the closure member as it is positioned downwardly over the open end of the container body.

14. A container, as claimed in claim 3, wherein the closure means comprises:
a generally horizontal lid member adapted for placement over the open end of the container body,
an annular retaining bead integrally formed on the top side of the lid member;
an inwardly extending annular flange integrally formed adjacent the upper end of the depending side wall structure; and
means adapted to effect an interlock between the annular retaining bead and the annular flange.

15. A container, as claimed in claim 3, wherein the closure means is of one-piece construction.

16. A container, as claimed in claim 3, wherein the lower portion of the generally cylindrical side wall structure of the container body is inwardly tapered toward the bottom thereof whereby the container body may be stacked in a nested fashion with other similar container bodies.

17. A container, as claimed in claim 3, wherein the plastic is high density polyethylene.

References Cited

UNITED STATES PATENTS

| 2,542,350 | 2/1951 | Paulsen | 220—60 |
| 3,147,857 | 9/1964 | Eckles | 220—60 |

THERON E. CONDON, *Primary Examiner.*

J. B. MARBERT, *Assistant Examiner.*